US005662336A

United States Patent [19]

Hayashi et al.

[11] Patent Number: 5,662,336

[45] Date of Patent: Sep. 2, 1997

[54] WATERPROOF SEAL FOR CONNECTOR WITH FRUSTOCONICAL END SURFACES

[75] Inventors: Hiroyuki Hayashi; Shinichi Yamada, both of Yokkaichi, Japan

[73] Assignee: Sumitomo Wiring Systems, Ltd., Mie, Japan

[21] Appl. No.: 734,483

[22] Filed: Oct. 21, 1996

Related U.S. Application Data

[63] Continuation of Ser. No. 496,005, Jun. 28, 1995, abandoned.

[30] Foreign Application Priority Data

Jul. 20, 1994 [JP] Japan .................................... 6-190972

[51] Int. Cl.$^{6}$ ........................................................ F16J 15/02

[52] U.S. Cl. .......................... 277/208; 277/209; 439/275; 439/587

[58] Field of Search .................................... 277/178, 100, 277/208, 209, 210; 439/271, 274, 275, 279, 587

[56] References Cited

U.S. PATENT DOCUMENTS

| | | | |
|---|---|---|---|
| 2,705,308 | 3/1955 | Howard | 439/274 |
| 2,897,533 | 8/1959 | Bull et al. | 277/178 |
| 3,243,240 | 3/1966 | Arthur | 277/178 |
| 3,517,113 | 6/1970 | Takahisa et al. | 439/275 |
| 5,224,875 | 7/1993 | Watanabe et al. | 439/587 |

FOREIGN PATENT DOCUMENTS

| | | | |
|---|---|---|---|
| 630073 | 12/1994 | European Pat. Off. | 439/271 |
| 2604566 | 4/1988 | France . | |
| 40 33 558 A1 | 4/1992 | Germany . | |
| 4-46111 | 10/1992 | Japan . | |
| 1444245 | 7/1976 | United Kingdom . | |

*Primary Examiner*—Scott Cummings
*Attorney, Agent, or Firm*—Oliff & Berridge

[57] ABSTRACT

A waterproof seal for a connector has a generally tubular body. Each of opposite end surfaces, formed respectively at opposite ends of the tubular body, is shaped such that two adjacent waterproof seals that contact either of the opposite end surfaces of the other waterproof seal are prevented from sticking to each other. Specifically, each of the opposite end surfaces is formed into a substantially conical shape. With this construction, even if the waterproof seal is made of oil-containing rubber or the like exhibiting a sticky nature, the waterproof seals will not stick to each other, and the waterproof seals can be smoothly fed in order by a parts feeder.

5 Claims, 3 Drawing Sheets

WATERPROOF SEAL FOR CONNECTOR WITH FRUSTOCONICAL END SURFACES

This is a continuation of application Ser. No. 08/496,005, filed Jun. 28, 1995, now abandoned.

BACKGROUND OF THE INVENTION

1. Field of the Invention

This invention relates to a waterproof seal for use in a waterproof connector.

2. Description of the Related Art

A waterproof connector has a construction, for example, as shown in FIG. 6. A metal terminal 3 is inserted into a cavity 2 in a connector housing 1 and is retained by a lance 4 against withdrawal. A waterproof seal 6 is fitted on a wire 5 connected to the metal terminal 3. This conventional waterproof seal 6 is of a generally cylindrical shape and has opposite end surfaces that are annular and flat. The wire 5 is passed through a bore of the cylindrical seal 6, and an outer peripheral surface of the seal 6 is held in pressure-contact with an inner peripheral surface of the cavity 2.

It is a common practice to pass the wire 5 through the waterproof seal 6 of this type by the use of an automatic machine in assembling the connector. Waterproof seals 6 are supplied to a wire insertion machine by a parts feeder. In the parts feeder, a number of waterproof seals 6 are charged, for example, into a stock bowl, and the seals 6 then are supplied therefrom one by one in a row to the wire insertion machine by vibration.

The waterproof seal of this type is often made of oil-containing rubber, comprising silicone rubber impregnated with oil, so that the material of the seal is more water repellant, thereby enhancing a waterproof performance of the connector. However, the oil exudes to the surface of the waterproof seal, and therefore, the waterproof seals charged into the stock bowl have often stuck to one another because of a surface tension of the oil. More specifically, since the conventional waterproof seal has the opposite flat end surfaces of a relatively large size, adjacent waterproof seals 6 have become stuck at their ends to one another as shown in FIG. 7 and FIG. 8, which has made it difficult to arrange the waterproof seals in order in the parts feeder, thus causing troubles in the manufacture of the connectors.

SUMMARY OF THE INVENTION

It is therefore an object of this invention to provide a waterproof seal for a connector that will not stick to another waterproof seal of the same construction even if the waterproof seal is made of a material such as oil-containing rubber having a sticky nature, thereby preventing troubles in assembling the connector.

This and other objects of the invention are achieved by a waterproof seal for a connector in which each of end surfaces, formed respectively on axially opposite ends of a tubular body, is shaped such that either of the opposite end surfaces of one of two waterproof seals disposed adjacent each other can contact either of the opposite end surfaces of the other waterproof seal at a small contact area. In this case, more effectively, each of the opposite end surfaces is formed into a substantially conical shape.

When the waterproof seals of the same kind are charged into a container such as a stock bowl, the adjacent waterproof seals often butt against each other at their end surfaces. In the above construction, however, the opposite end surfaces of the tubular body are shaped such that either of the opposite end surfaces of one of two adjacent waterproof seals can contact either of the opposite end surfaces of the other waterproof seal at a small contact area. Therefore, even if the waterproof seal is made of oil-containing rubber or the like exhibiting a sticky nature, the waterproof seals will not stick to each other.

Particularly, when each end surface is formed into a conical shape, the conical end surfaces of the two waterproof seals butt against each other at their tops, that is, at a small contact area.

BRIEF DESCRIPTION OF THE DRAWINGS

These and other aspects and advantages of the present invention will become apparent from the following detailed description of preferred embodiments when taken in conjunction with the accompanying drawings, in which.

DETAILED DESCRIPTION OF PREFERRED EMBODIMENTS

A preferred embodiment of the present invention will now be described with reference to FIGS. 1 to 4.

Figure 1:
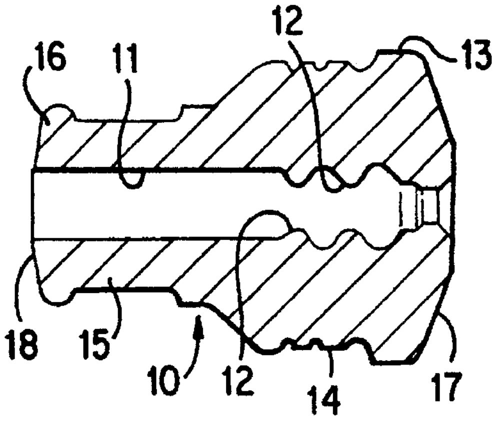
FIG. 1 is a longitudinal cross-sectional view of one preferred embodiment of a waterproof seal of the present invention.
Figure 2:
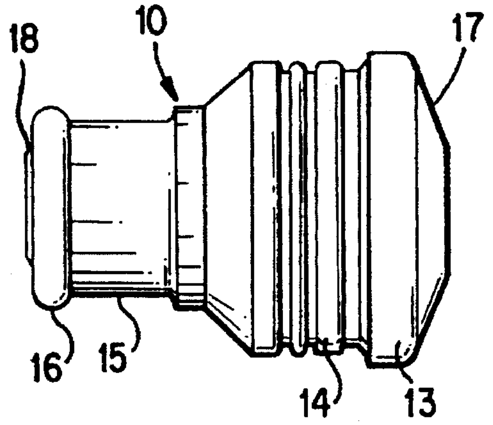
FIG. 2 is a side-elevational view of the waterproof seal.
Figure 3:
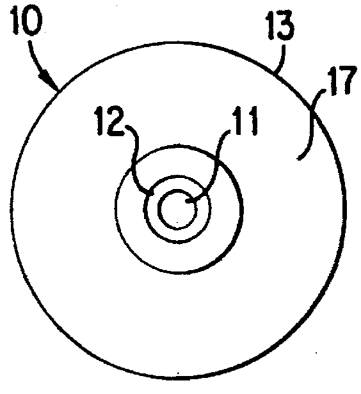
FIG. 3 is a front-elevational view of the waterproof seal, showing a larger-diameter side thereof.
Figure 4:
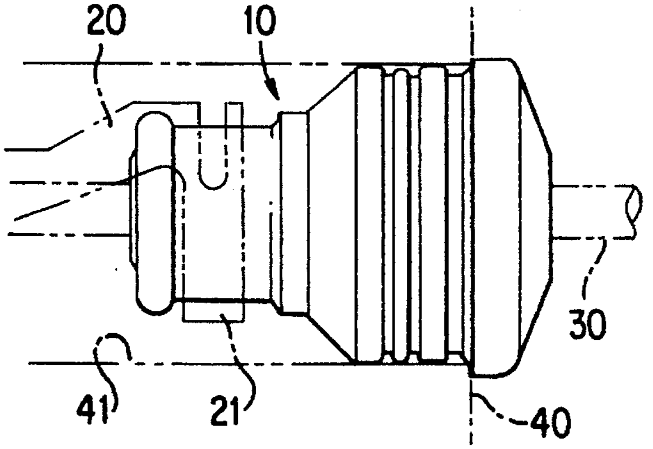
FIG. 4 is a side-elevational view showing a condition in which the waterproof seal is mounted on a connector housing.

A waterproof seal 10 of the invention for a connector is preferably made of oil-containing rubber comprising silicone rubber impregnated with oil. As shown in FIGS. 1 to 3, the waterproof seal 10 is of a generally cylindrical shape and has a wire insertion hole 11 formed axially therethrough. A wire 30 connected to a metal terminal 20 (only part of which is shown in FIG. 4) is passed through the wire insertion hole 11. A plurality of annular wire lips 12 are formed on and project from an inner peripheral surface of the wire insertion hole 11. The lips 12 are held in intimate contact with an outer peripheral surface of the wire 30 to form a watertight seal therebetween.

The waterproof seal 10 includes an annular, larger-diameter portion 13 at a right end thereof (FIGS. 1 and 2), a plurality of outer peripheral lip portions 14 slightly smaller in diameter than the larger-diameter portion 13, and a clamping portion 15 smaller in diameter than the lip portions 14. A barrel portion 21 of the metal terminal 20 is clamped onto the clamping portion 15, so that the wire 30 and the waterproof seal 10 are connected to the metal terminal 20. The outer peripheral lip portions 14 and the clamping portion 15 are inserted into a cavity 41 in a connector housing 41 as shown in FIG. 4, so that the outer peripheral lip portions 14 are brought into intimate contact with an inner peripheral surface of the cavity 41 to form a watertight seal between the waterproof seal 10 and the inner peripheral surface of the cavity 41. At this time, the larger-diameter portion 13 is abutted against an open end or edge of the cavity 41 to position the waterproof seal 10 and also to close the cavity 41 from the outside to prevent water from collecting in the vicinity of the open end of the cavity 41. An annular retaining portion 16 of a larger diameter than the clamping portion 15 is formed on the clamping portion 15 at the distal end thereof.

In this embodiment, end surfaces 17 and 18, formed respectively at the axially-opposite ends of the tubular waterproof seal 10, are defined by a conical surface projecting slightly progressively toward its center portion, as seen from FIGS. 1 and 2, in contrast with the conventional construction in which the opposite ends are defined by an annular flat surface. With this construction, for example, even if the end surface 17 of one waterproof seal 10 at the end of the larger-diameter portion 13 butts against the end surface 17 or end surface 18 of another waterproof seal 10, the area of contact between the butted end surfaces is small because of their configuration, and the butted waterproof seals 10 are prevented from attaching to each other.

In assembling the connector, the wire 30 is passed through the waterproof seal 10 of the above construction by the use of an automatic machine. At this time, a number of waterproof seals 10 are charged into a stock bowl of a parts feeder (not shown) and are supplied therefrom one by one in a row to a wire insertion machine. Before the waterproof seals 10 are arranged into the row, the seals 10 have various postures in the stock bowl, and therefore, the end surface 17 of one of the adjacent seals 10 often butts against the end surface 18 another seal 10. However, as described above, the end surfaces 17 and 18 are of a substantially conical shape, and the area of contact between them is small. Hence, even if the waterproof seal 10 is made of oil-containing rubber, so that oil exudes to the surface of the seal, a sticking force at the contact area is very small. Hence, even if the waterproof seal 10 temporarily sticks to another waterproof seal 10, they can be easily separated from each other by vibrations applied by the parts feeder. Accordingly, the arrangement of the waterproof seals 10 in the row will not be affected, and trouble will be avoided during manufacture.

Furthermore, in this embodiment in which the end surfaces 17 and 18 are shaped such that the end surfaces of adjacent seals contact each other with a small contact area, a mold for forming the waterproof seal 10 is simpler in construction and can be produced at lower costs as compared with a seal construction in which projections are formed on each end surface thereof to prevent sticking of one waterproof seal to another. In addition, without such projections, less material is used, and the waterproof seal 10 is lightweight. Generally, many waterproof seals of this kind are used in one connector. For example, a number of waterproof seals are used in one automobile. Although the amount of saved material, as well as the amount of weight reduction, per waterproof seal is small, the overall amount is large, and a great economical advantage can be achieved.

As described above, even if the waterproof seal of the invention for a connector is made of a material, such as oil-containing rubber, exhibiting a sticky nature, the waterproof seals will not stick to one another, thereby achieving an excellent advantage by preventing trouble in assembling of the connector.

The present invention is not to be limited to the embodiment described above and shown in the drawings, and for example, at least the following modifications can be made within the scope of the present invention. Moreover, the invention is not limited to those described below, and various modifications can be made without departing from the scope of the invention.

(1) In the above embodiment, although the opposite end surfaces of the waterproof seal 10 are of a conical shape, the invention is not limited to this, and each end surface may have a polygonal shape defined by a plurality of flat sector-like surfaces arranged on a conical surface.

Figure 5:
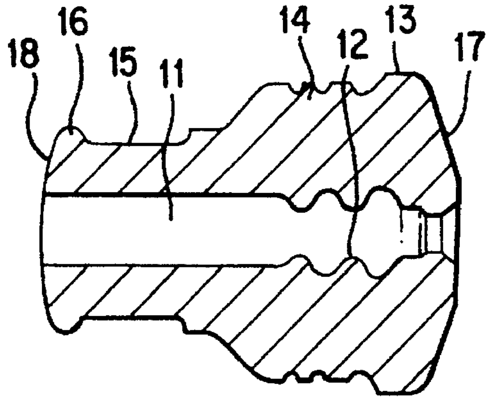
FIG. 5 is a longitudinal cross-sectional view of another embodiment of the invention.
Figure 6:
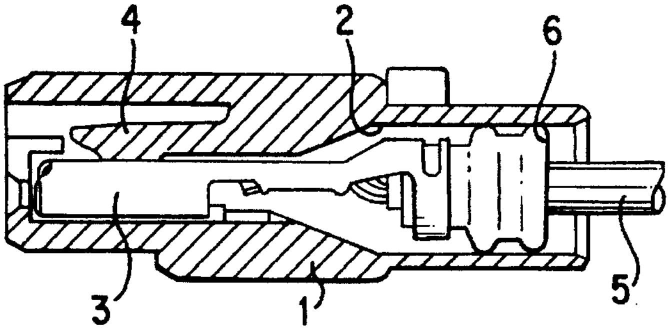
FIG. 6 PRIOR ART
FIG. 6 is a longitudinal cross-sectional view of a connector housing incorporating a conventional waterproof seal.
Figure 7:
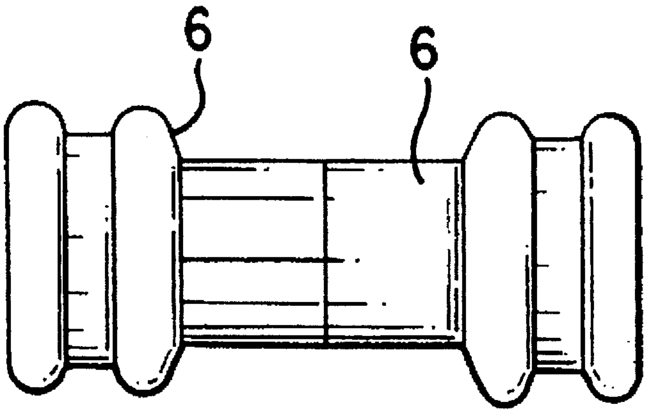
FIG. 7 PRIOR ART
FIG. 7 is a side-elevational view of the conventional waterproof seal.
Figure 8:
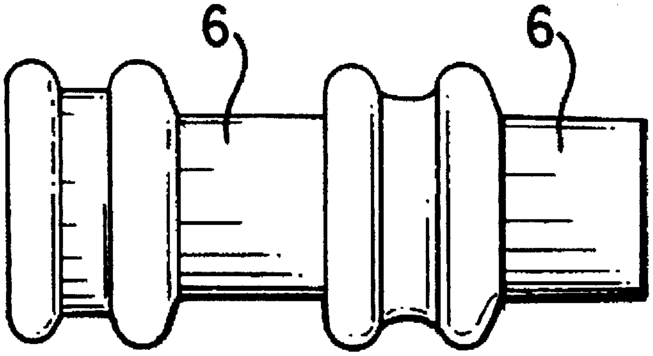
FIG. 8 PRIOR ART
FIG. 8 is a side-elevational view of the conventional waterproof seal.

(2) The opposite end surfaces may be rounded or generally semi-spherical as shown in FIG. 5. The embodiment of FIG. 5 is identical in construction to the above-mentioned embodiment except for the shape of the end surfaces, and therefore, the portions identical to those of the above embodiment are designated by identical reference numerals, respectively, and explanation thereof is omitted.

What is claimed is:

1. A waterproof seal for a connector, comprising a tubular body shaped to receive a wire connected to a metal terminal, said tubular body being insertable into a cavity in a connector housing to form a watertight seal between an outer periphery of said wire and an inner periphery of said cavity, wherein axially opposite ends of said tubular body each have a small contact area and a substantially frustoconical shape, wherein the diameter of the substantially frustoconical shape decreases towards the axial end.

2. A waterproof seal according to claim 1, wherein said seal is formed of a material comprising silicone rubber impregnated with oil.

3. A waterproof seal for a connector, comprising:

a tubular body shaped to receive a wire connected to a metal terminal, said tubular body being insertable into a cavity in a connector housing to form a watertight seal between an outer periphery of said wire and an inner periphery of said cavity; and means for preventing axially opposite ends of said tubular body from sticking to axially opposite ends of an adjacent waterproof seal, said means for preventing comprising axially opposite ends of said tubular body having a small contact area and substantially frustoconical shape, wherein the diameter of the substantially frustoconical shade decreases towards the axial end.

4. A waterproof seal according to claim 3, wherein said seal is formed of a material comprising silicone rubber impregnated with oil.

5. A waterproof seal for a connector, comprising a tubular body shaped to receive a wire connected to a metal terminal, said tubular body being insertable into a cavity in a connector housing to form a watertight seal between an outer periphery of said wire and an inner periphery of said cavity, wherein at least one of axially opposite ends of said tubular body is shaped to have a small contact area and substantially frustoconical shape, wherein the diameter of the substantially frustoconical shape decreases towards the axial end.

* * * * *